US007878360B2

(12) United States Patent
Takeda

(10) Patent No.: US 7,878,360 B2
(45) Date of Patent: Feb. 1, 2011

(54) CONTAINER FOR SEALANT FOR PNEUMATIC TIRES

(75) Inventor: Yuji Takeda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1280 days.

(21) Appl. No.: 11/444,340

(22) Filed: Jun. 1, 2006

(65) Prior Publication Data
US 2006/0272731 A1 Dec. 7, 2006

(30) Foreign Application Priority Data
Jun. 2, 2005 (JP) ............................ 2005-162809

(51) Int. Cl.
  B65D 51/16 (2006.01)
  F16K 15/14 (2006.01)
  F16K 21/04 (2006.01)
(52) U.S. Cl. ............ 220/203.13; 137/859; 220/203.11; 220/203.29
(58) Field of Classification Search ................ 220/676, 220/203.13, 203.15, 203.29, 203.11, 203.27, 220/714, 203.09; 137/859, 855, 852, 851, 137/843
See application file for complete search history.

(56) References Cited

U.S. PATENT DOCUMENTS

| | | | | |
|---|---|---|---|---|
| 4,969,493 | A * | 11/1990 | Lee | 141/38 |
| 5,121,840 | A * | 6/1992 | Schram | 206/522 |
| 5,617,897 | A * | 4/1997 | Myers | 137/859 |
| 6,240,962 | B1 * | 6/2001 | Tai et al. | 137/859 |
| 6,390,130 | B1 * | 5/2002 | Guala | 137/859 |
| 6,508,379 | B1 * | 1/2003 | Van De Pol-Klein Nagelvoort et al. | 220/714 |
| 6,708,849 | B1 * | 3/2004 | Carter et al. | 222/153.1 |
| 7,021,348 | B2 * | 4/2006 | Eriksen et al. | 152/415 |

(Continued)

FOREIGN PATENT DOCUMENTS

CN 1576177 A 2/2005

(Continued)

OTHER PUBLICATIONS

Chinese Office Action dated Mar. 6, 2009 (5 pages).

*Primary Examiner*—Anthony Stashick
*Assistant Examiner*—Niki M Eloshway
(74) *Attorney, Agent, or Firm*—Sughrue Mion, PLLC

(57) ABSTRACT

A container for storing and injecting a liquid sealant for sealing and closing a puncture hole of a pneumatic tire includes a container body for storing the sealant. An outlet for injecting the sealant to outside opens in a lid securing portion of the container body, and an outer lid member having a sealant path therethrough is connected to the lid securing portion and communicates the sealant path with an interior space of the container body through the outlet. An inner lid member is press-fitted into the outlet and maintained in a closure position for tightly closing the outlet. The inner lid member can be forced from the closure position into inside of the sealant path, by the pressure of the sealant in the container body and/or by the pressure of gas above the sealant. A connector member connects the inner lid member to the lid securing portion or the outer lid member so as to be movable from the closure position to the interior of the sealant path. The connector member limits the movement of the inner lid member toward downstream side, after it has been forced from the closure position.

5 Claims, 9 Drawing Sheets

U.S. PATENT DOCUMENTS

| | | | |
|---|---|---|---|
| 7,419,069 B2 * | 9/2008 | Naesje | 220/714 |
| 2002/0121331 A1 * | 9/2002 | Gerresheim et al. | 156/115 |
| 2004/0250864 A1 * | 12/2004 | Zelson | 137/859 |
| 2006/0142420 A1 * | 6/2006 | Nakazawa et al. | 523/166 |
| 2007/0251592 A1 * | 11/2007 | Christenson et al. | 137/859 |

FOREIGN PATENT DOCUMENTS

| | | |
|---|---|---|
| CN | 1604840 A | 4/2005 |
| JP | 2004-338476 A | 12/2004 |

* cited by examiner (A)

(B)

(A)

(B)

(C)

(A)

(B)

(A)

(B)

CONTAINER FOR SEALANT FOR PNEUMATIC TIRES

TECHNICAL FIELD

The present invention relates to a container for a sealant for sealing punctured pneumatic tires, which serves to stole the sealant under a hermetically closed state until the tire is punctured, and inject the sealant from the container into the tire once it has been punctured.

BACKGROUND ART

Sealing/pump-up device has recently become widespread, which is used upon puncture of a pneumatic tire so as to repair the punctured tire by a sealant without requiring replacement of the tire/rim assembly, and to pump-up for increasing the inner pressure of the tire to a prescribed pressure level that is designated depending upon the type and specification of tires.

This type of sealing/pump-up device is disclosed, for example, in Japanese Unexamined Patent Application Publication No. 2004-338476, and includes a sealant container having an interior space as a chamber for storing the sealant, and a chamber container arranged on the lower side of, and adjacent to, the sealant container and having an interior space as an air chamber. The sealant container and the chamber container each has a side wall of substantially bellows-like structure so as to be extendible and contractible in the height direction. The sealant container includes an outlet for the sealant, which is connected to a proximal end of a joint hose be joint hose has a distal end provided with an adapter, which can be connected to a tire valve.

With the sealing/pump-up device having the above-mentioned structure, after connecting the adapter of the joint hose to the valve of a punctured tire, the chamber container previously maintained in its contracted state is supplied with compressed air so that the chamber container is inflated to have an increased volume, with the result that the sealant container is contracted to have a reduced volume, thereby injecting the sealant from the sealant container into the joint hose under a pressure so that the sealant in supplied, through the joint hose and the adapter, into the inner space of the punctured tire.

It is important to ensure that the sealant as used in the sealing/pump-up device of the type described above is stored under a hermetically closed condition, since otherwise the sealant gradually undergoes degradation due to oxidization of the ingredients, evaporation of the volatile components, etch thereby lowering the sealing property with time. Therefore, this type of sealing/pump-up device is stored during the period from its production in a factory to the beginning of repair with respect to a punctured tire so that, for example, the outlet of the sealant container is tightly closed by a seal element (inner lid) made of aluminum foil or the like, and a cap (outer lid member) is secured, by a screw connection or the like, to the sealant container so as to cover the outlet from outside.

For repairing a tire with the sealing/pump-up device as described above, it is first of all necessary for the operator to remove the cap from the liquid container and remove the seal element from the liquid container, before connecting the joint hose to the outlet of the liquid container. This means that, before repairing the tire with the sealing/pump-up device, troublesome preparatory steps must be manually performed by an operator.

In order to facilitate the above-mentioned preparatory works, there has been proposed a sealing/pump-up device provided with a piercing tube member at the proximal end portion of the joint tube or at the container loading portion in the main body of the device. In this instance, when the joint hose is connected to the outlet of the liquid container or the liquid container is loaded onto the loading portion, the seal element is pierced by the piercing tube so as to communicate therethrough the interior space of the liquid container with the joint hose. However, when the piercing tube is pierced through the seal element for communicating the interior space of the liquid container with the joint hose, parts or fractions of the seal element are mixed into the sealant to cause clogging in a sealant path constituted by the piercing tube, joint hose, internal tubes, sealant feed pump, tire valve, etc., with the result that the sealant stored in the liquid container cannot be supplied to the interior of the tire.

DISCLOSURE OF THE INVENTION

It is therefore an object of the present invention to eliminate the above-mentioned problems of the prior art and provide an improved container for storing and injecting a liquid sealant whereby, upon beginning a repair of a pneumatic tire, the inner lid member for tightly closing the outlet of the liquid container is automatically removed from the outlet, while the inner lid member removed from the outlet is positively prevented from causing clogging of the sealant path and passages for communicating the sealant path with the interior space of the tire.

A fist aspect of the present invention resides in a container for storing and injecting a liquid sealant for sealing and closing a puncture hole of a pneumatic tire, comprising: a container body having an interior space for storing the sealant, and having a lid securing portion in which opens an outlet for injecting the sealant to outside; an outer lid member having an interior through which extends a sealant path for allowing passage of the sealant therethrough, the outer lid member being connected to the lid securing portion and communicating the sealant path with the interior space of the container body through the outlet; an inner lid member press-fitted into the outlet and maintained in a closure position for tightly closing the outlet, the inner lid member being forced from the closure position into inside of the sealant path, by at least one of a pressure of the sealant stored in the container body and a pressure of a gas above the sealant; a connector member for connecting the inner lid member to one of the lid securing portion and the outer lid member so as to be movable from the closure position to the interior of the sealant path, and limiting a movement of the inner lid member toward downstream side, after it has been forced from the closure position into the inside of the sealant path.

In the container for storing and injecting a sealant according to the first aspect of the present invention, prior to the repair of puncture with respect to a pneumatic tire, the inner lid member is maintained press-fitted in the outlet of the container body and maintained in a closure position for tightly closing the outlet. It is thus possible to maintain the outlet of the container body tightly closed by the inner lid member in a positive manner. Upon the repair of puncture, on the other hand, the inner lid member is forced from the closure position into inside of the sealant path, by the pressure of the sealant stored in the container body and/or the pressure of gas above the sealant. It is thus possible to open the outlet of the container body, which had been tightly closed by the inner lid member, thereby allowing the sealant in the container body to be injected out of the container through the sealant path.

In the container for storing and injecting a sealant according to the first aspect of the present invention, furthermore, the connector member serves to connect the inner lid member to the lid securing portion or the outer lid member so as to be movable from the closure position to the interior of the sealant path, and to limit a movement, toward the downstream side, of the inner lid member after it has been forced from the closure position into the inside of the sealant path. It is thus possible to maintain the inner lid member at a predetermined location within the sealant path, against the flow of the sealant as it is injected from the container body into the sealant path. If the inner diameter of the sealant path on the upstream side of the predetermined location is made larger than the outer diameter of the inner lid member, not only the sealant in the container body can be positively injected out of the container through the sealant path, but also it is possible to positively prevent clogging of the inner lid member in the sealant path or passages outside of the container, for connecting the sealant path to the interior space of the tire. Therefore, it is possible to positively avoid a situation where the inner lid member removed from the outlet causes clogging of the sealant path and passages for communicating the sealant path with the interior space of the tire.

A second aspect of the present invention resides in a container for storing and injecting a liquid sealant according to the first aspect, further comprising a seal member arranged between the lid securing portion and the outer lid member for providing a seal between the lid securing portion and the outer lid member, the seal member being formed integrally with the connector member and the inner lid member.

A third aspect of the present invention resides in a container for storing and injecting a liquid sealant according to the first or second aspect, wherein the seal member is resiliently extendible/contractable along a flow direction of the sealant in the sealant path.

A fourth aspect of the present invention resides in a container for storing and injecting a liquid sealant according to the first aspect, wherein the connector member comprises: a rod-like cord portion with an outer diameter that is smaller than an inner diameter of the outlet, the cord portion having one end coupled to the inner lid member, and the other end inserted into the interior space of the container body, and a rod-like anchor portion with a total length that is larger than the inner diameter of the outlet, the anchor portion having a longitudinally intermediate region that is fixedly secured to said the other end of the cord portion so as to be retained in the interior space of the container body.

A fifth aspect of the present invention resides in a container for storing and injecting a liquid sealant according to any one of the first through fourth aspect, wherein the sealant path comprises an upstream portion provided with a reservoir section, the reservoir section having an inner diameter that is larger than an outer diameter of the inner lid member, and also with a flow restriction section on the downstream side of the reservoir section, the flow restriction section having an inner diameter that is smaller than the outer diameter of the inner lid member; and the outer lid member comprises an inner lid member trap means for inhibiting a movement of the inner lid member from the reservoir section to the flow restriction section, while allowing flow of the sealant from the reservoir section to the flow restriction section.

A sixth aspect of the present invention resides in a container for storing and injecting a liquid sealant according to any one of the first though fifth aspects, further comprising a plunger member arranged in the interior space of the container body, for dividing the interior space of the container body into a liquid chamber portion filled with the sealant, and a gas chamber portion adapted to be supplied with compressed gas from outside, the plunger member being movable in a injecting direction thereby increasing a volume of the gas chamber portion while decreasing a volume of the liquid chamber portion.

A seventh aspect of the present invention resides in a container for storing and injecting a liquid sealant according to the sixth aspect, wherein the inner lid member is forced from the closure position to the inside of the sealant path by causing a movement of the plunger member so as to decrease the volume of the liquid chamber portion, thereby increasing at least one of the pressure of the sealant and the pressure of gas above the sealant.

As explained above, the present invention provides an improved container for storing and injecting a liquid sealant whereby, upon beginning a repair of a pneumatic tire, the inner lid member for tightly closing the outlet of the liquid container is automatically removed from the outlet, while the inner lid member removed from the outlet is positively prevented from causing clogging of the sealant path and passages for communicating the sealant path with the interior space of the tire.

BRIEF DESCRIPTION OF THE DRAWINGS

FIGS. 1(A) and 1(B) are explanatory views illustrating a sealing/pump-up device incorporating a cylindrical container according to a first embodiment of the present invention, respectively, wherein FIG. 1(A) shows a state before injection of a sealant into a tire, and FIG. 1(B) shows a state after injection of the sealant into the tire.

FIGS. 3(A) and 3(B) are sectional views illustrating the structure of the upper neck portion, the inner lid member and the outer lid cap in the cylindrical container of FIG. 2, wherein FIG. 3(A) shows a state in which the inner lid member and the outer lid cap are removed from the upper neck portion, and FIG. 3(B) shows a state in which the inner lid member and the outer lid cap are connected to the upper neck portion.

FIGS. 7(A) and 7(B) are sectional views illustrating the structure of the upper neck portion, the inner lid member and the outer lid cap in the cylindrical container according to a second embodiment of the present invention, wherein FIG. 7(A) shows a state in which the inner lid member and the outer lid cap are removed from the upper neck portion, and FIG. 7(B) shows a state in which the inner lid member and the outer lid cap are connected to the upper neck portion.

BEST MODE FOR CARRYING OUR THE INVENTION

Figure 1:
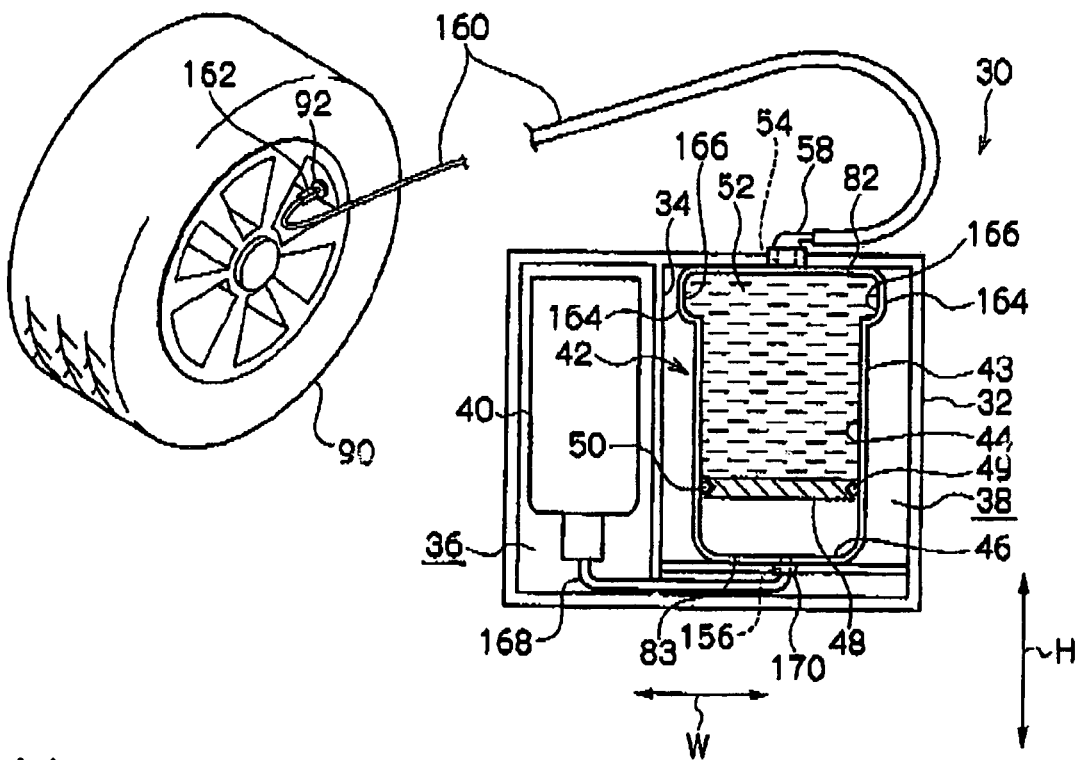
Figure 1:
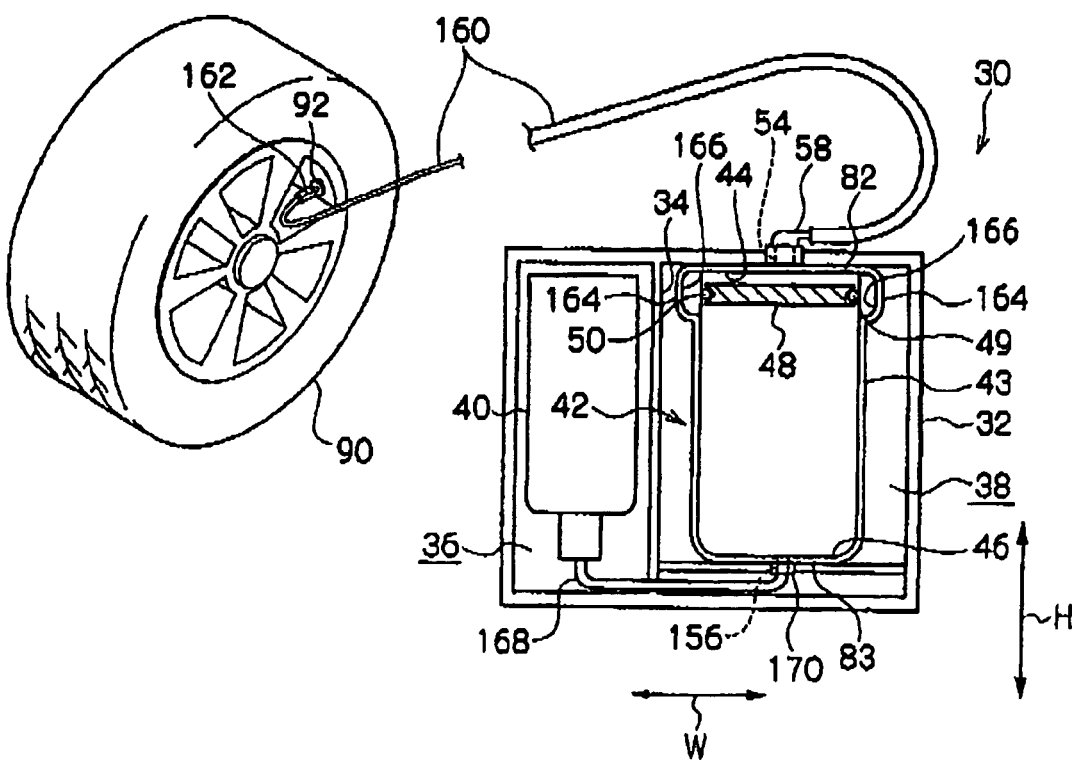

The container for storing and injecting a sealant according to the present invention will be described below in further detail, with reference to preferred embodiments shown in the drawings, wherein the container comprises a cylindrical container.

First Embodiment

Structure of the Sealing/Pump-Up Device

A sealing/pump-up device for repairing a punctured pneumatic tire of a vehicle is shown in FIG. 1, to which is applied a cylindrical container according to a first embodiment of the present invention. More specially, the sealing/pump-up device designated as a whole by reference numeral 30 is used upon puncture of a pneumatic tire, so as to repair the punctured tire by a sealant without requiring replacement of the tire/rim assembly, and to pump-up the tire for increasing its inner pressure to a prescribed pressure level that is designated depending upon the type and specification of tires.

As shown in FIG. 1, the sealing/pump-up device 30 includes a casing 32 having an interior space that is divided by a partition 34 into two chambers 36, 38. The chamber 36 serves to accommodate an integrated air compressor unit 40 comprised of a motor, compressor, electric power circuit, eta The air compressor unit 40 also includes a power supply cable (not shown), having a plug that can be inserted, for example, into a cigar lighter socket of a vehicle so that the air compressor unit 40 is supplied with an electric power from a battery mounted on the vehicle.

The other chamber 38 serves to accommodate a substantially cylindrical container 42 that is comprised of a substantially cylindrical container body 43 for storing a liquid sealant 52. A substantially disc-like plunger member 48 is arranged within the container body 43, for dividing the interior space of the container body 43 vertically (i.e., in the height direction H) into two chamber, i.e., a liquid chamber 44 and an air chamber 46. The plunger member 48 has an outer peripheral surface formed with a circumferential groove 49 of a semicircular cross-section. A seal ring in the form of an O-ring 50 made of silicone rubber or the like is fitted into the circumferential groove 49. The O-ring 50 is in pressure contact with the inner peripheral surface of the container body 43 and thus serves to seal the space between the outer peripheral surface of the plunger member 48 and the inner peripheral surface of the container body 43. The plunger member 48 is movable in the height direction of the container body 53, while maintaining the O-ring 50 in pressure contact with the inner peripheral surface of the container body 43.

In the container body 43, the liquid chamber 44 on the upper side of the plunger member 48 serves to store the sealant 52. More particularly, the liquid chamber 44 of the container body 43 is filled with a predetermined volume of sealant 52, which is slightly larger than a specific volume (e.g., 200 to 400 grams) that is designated in advance depending upon the type and specification of a tire 90 to be repaired by the sealing/pump-up device 30. When the liquid chamber 44 is filled with the predetermined volume of sealant 52, as shown in FIG. 1(A), the plunger member 48 assumes its lowermost position so as to maximize the inner volume of the liquid chamber 44 and minimize the inner volume of the air chamber 46. In the sealing/pump-up device 30 as illustrated, when the plunger member 48 is moved upwards (i.e., in the injection direction), the inner volume of the liquid chamber 44 is gradually decreased while the inner volume of the air chamber 46 is gradually increased.

Figure 3:
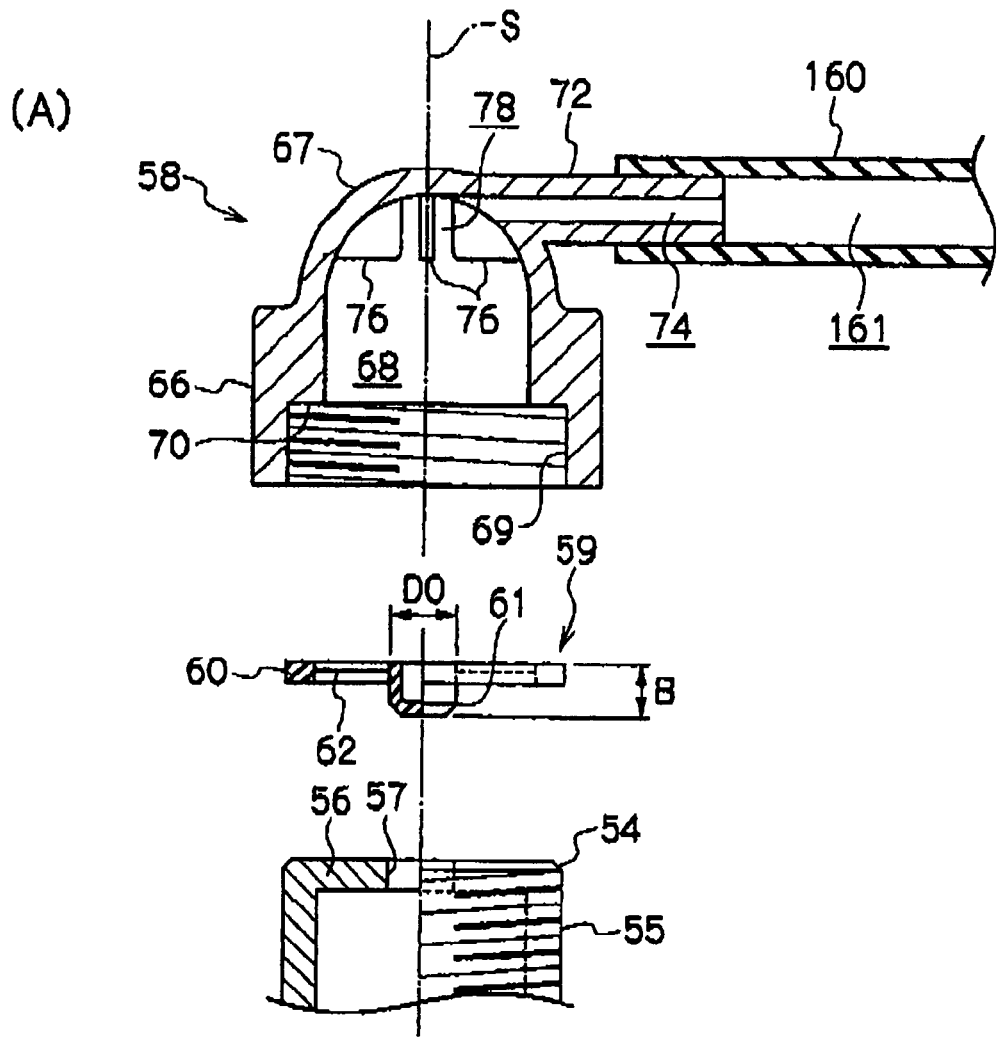
Figure 3:
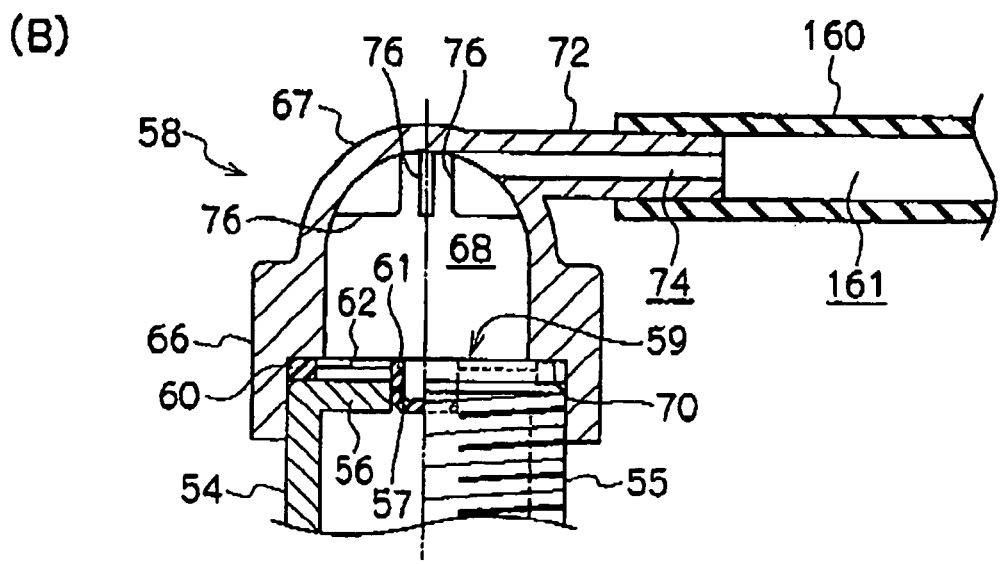

As further shown in FIG. 1(A), the container body 43 includes a top plate 82 having in its a center region an upper neck portion 54 that projects upwards. With reference to FIG. 3(A), the upper neck portion 54 is formed with a male thread 55 on its outer peripheral surface. The upper neck portion 54 is integrally formed with a dislike nozzle plate 56 for partly closing the opening on the upper end side of the upper neck portion 54. The nozzle plate 56 has a center region that is formed with an outlet 57 of a circular cross-section. As shown in FIG. 3(B), the cylindrical container 42 is further provided with an outer lid cap 58 that is threadedly connected to the upper neck portion 54, and an inner lid member 59 that is clamped between the outer lid cap 58 and the upper neck portion 54.

Figure 5:
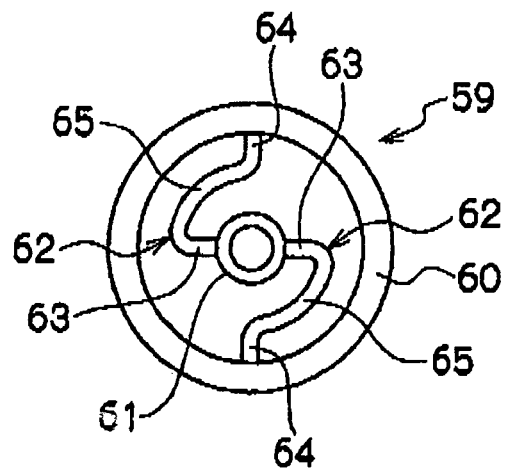
FIGS. 5(A), 5B) and 5(C) are a plan view and perspective views illustrating the structure of the inner lid member in the cylindrical container of FIG. 2, respectively.
Figure 5:
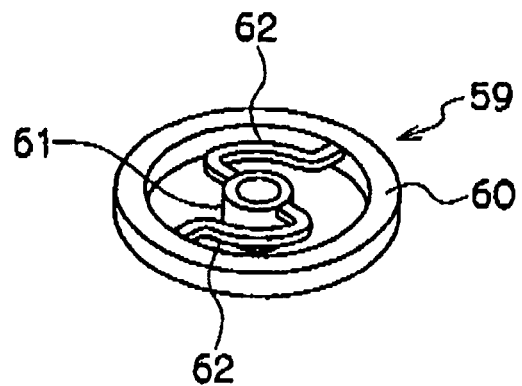
Figure 5:
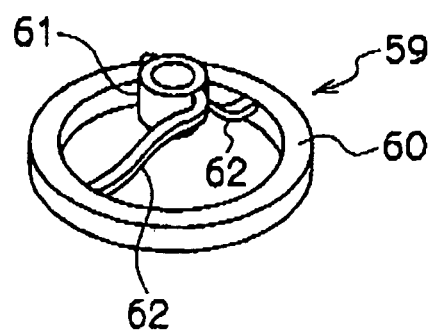

With reference to FIGS. 5(A) to 5(C), the inner lid member 59 is comprised of an annular seal ring 60 on its outer peripheral side, and an inner lid body 61 arranged on the radially inner side of the seal ring 60 coaxially thereto. The inner lid member 59 is further provided with a pair of connection cords 62 for connecting the seal ring 60 and the inner lid body 61 with each other. The inner lid member 59 as a whole, inclusive of the annular ring 60, the inner lid member 61 and the connection cords 62, is integrally molded from a suitable elastomer or elastic material, such as nitrile-butyl rubber (NBR), silicone rubber, or the like.

Each connection cord 62 is an elongate element including a radially inner end connected to the outer periphery of the inner lid body 61 and an outer end connected to the inner periphery of the seal ring 60. The cords 62 forming a pair are of the same shape, and arranged symmetrically with reference to the center axis S of the inner lid body 61.

As shown in FIG. 5(A), each connection cord 62 includes extensions 63, 64 on its inner and outer peripheral portions, which extend along the radial direction about the center axis S toward the inner and outer peripheral sides, respectively, and an arcuate intermediate portion 65 arranged between, and integrally connected to the extensions 63, 64. The intermediate portion 65 extends in the circumferential direction concentrically about the center axis S, over an angle of substantially 90°. When the connection cord 62 is applied with a pressing force in the axial direction, not only the extensions 63, 64 and the intermediate portion 65 are deflected in the axial direction, but also the intermediate portion 65 simultaneously deformed so as to increase the radius of curvature thereof. In this way, the connection cord 62 can be resiliently deformed in the axial direction, from the original, non-deformed state shown in FIG. 5(B) to the deformed state shown in FIG. 5(C).

The inner lid body 61 of the inner lid member 59 is formed as a cylinder having a closed bottom end, as shown in FIG. 3(B), with an outer diameter that is slightly larger than the inner diameter of the outlet 57. Before a punctured tire is repaired, the inner lid body 61 is press-fitted in the outlet 57 and thereby maintained in a closure position for tightly closing the outlet 57. In this instance, the inner lid body 61 is maintained in the closure position by a friction force between the outer peripheral surface of the inner lid body 61 and the inner peripheral surface of the outlet 57. Also, the seal ring 60 of the inner lid member 59 is arranged on the outer peripheral side at the top surface of the upper neck portion 54.

As shown in FIG. 3(A), the outer lid cap 58 is integrally formed with a cylindrical portion 66 on its lower side, and a semi-spherical top portion 67 that closes an upper end of the cylindrical portion 66. A reservoir chamber 68 is thereby formed within the outer lid cap 58, wherein the reservoir chamber 68 is defined as a space having a cylindrical lower side and a semi-spherical upper side. The cylindrical portion 66 has an inner peripheral surface including a lower end side that is formed with a female thread 69. The inner diameter of the female thread 69 corresponds to the outer diameter of the upper neck portion 54, i.e., the outer diameter of the male thread 55. The inner peripheral surface of the cylindrical portion 66 is further formed, at the upper end of the female thread 69, with a shoulder or stepped portion 70 that projects radially inwards.

As shown in FIG. 3(B), the outer lid cap 58 is connected with, and tightly secured to the upper neck portion 54 by engaging its female thread 69 with the male thread 55 of the upper neck portion 54. On this occasion, the stepped portion 70 of the outer lid cap 58 is brought into pressure contact with the seal ring 60 on the top surface of the upper neck portion 54. Thus, the seal ring 60 is compressed and clamped between the stepped portion 70 and the top surface of the upper neck portion 54, so as to form a hermetic seal structure between the outer lid cap 58 and the upper neck portion 54.

The outer lid cap 58 is integrally provided with a cylindrical connection tube 72, which projects radially outwards from a location adjacent to the upper end of the top portion 67. The connection tube 72 provides a liquid supply passage 74 therein, which extends through the connection tube 72 so that its one end opens into the reservoir chamber 68. The liquid supply passage 74 has an inner diameter (or cross-sectional area) that is sufficiently smaller than the inner diameter (or cross-sectional area) of the reservoir chamber 68. The inner diameter of the reservoir chamber 68 is sufficiently larger than the outer diameter DO of the inner lid body 61, as shown in FIG. 3(A).

The reservoir chamber 68 and the liquid supply passage 74 constitute a sealant path for supplying the sealant 52, which has been discharged form the container body 43 (liquid chamber 44), to the exterior of the cylindrical container 42.

Figure 6:
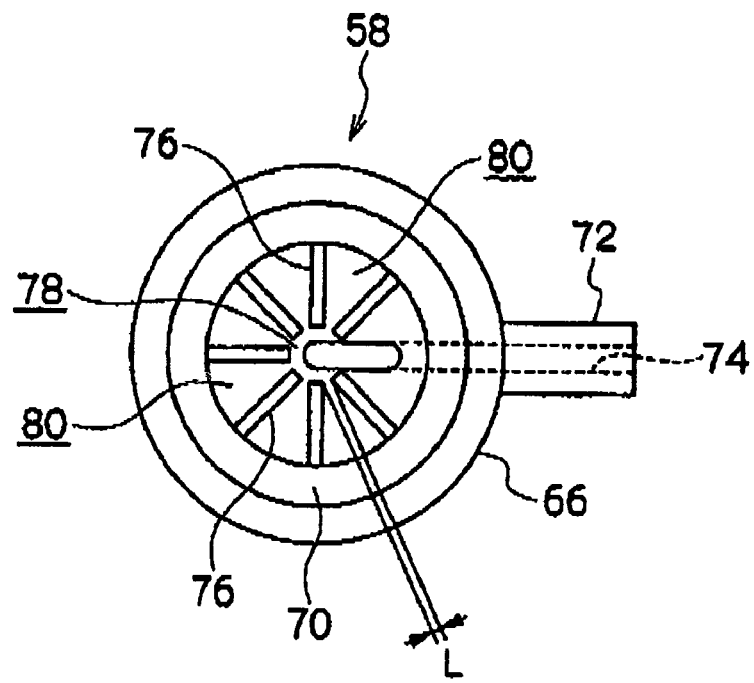
FIGS. 6(A) and 6(B) are a plan view and a sectional view, respectively, illustrating the structure of the outer lid cap in the cylindrical container of FIG. 2.
Figure 6:
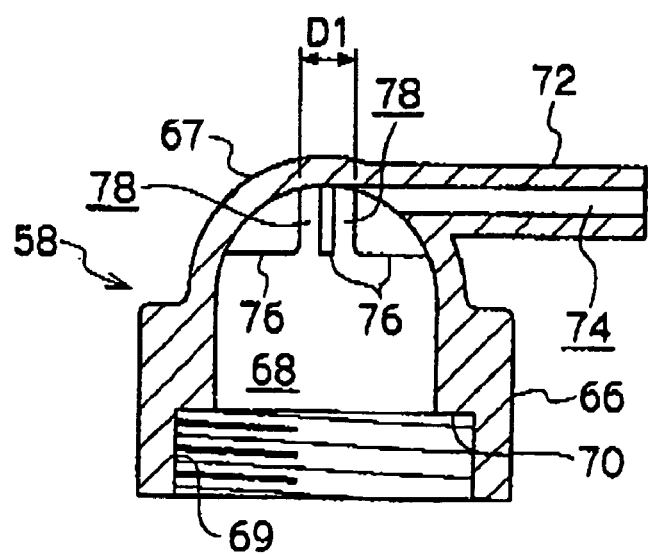

As shown in FIGS. 6(A) and 6(B), the outer lid cap 58 is integrally provided with a plurality of trap plates 76 (seven plates in the illustrated embodiment), which extend from the inner wall surface of the top portion 67 to project into the reservoir chamber 68. Each trap plate 76 is in the form of an isosceles triangle, and connected on its oblique side to the inner wall surface of the top portion 67. Except in the region of the top portion 67 where the liquid supply passage 74 opens, the trap plates 76 are spaced from each other in the circumferential direction by a constant angular distance (45 min the case of seven plates). Thus, on the upper side of the reservoir chamber 68, and on the radially inner side of the plurality of trap plates 76, a space is defined as a main passage portion 78 extending in the height direction and having a circular cross-section, as shown in FIG. 6(B). Also, between each pair of the trap plates 76 situated adjacent to each other, a space is defined as an auxiliary passage portion 80 extending in the height direction and having a sector cross-section, as shown in FIG. 6(A).

With reference to FIGS. 6(B) and 3(A), the main passage portion 78 has an inner diameter DI, which is smaller than the outer diameter DO of the inner lid body 61 by an amount not less than several millimeters. Also, the circumferential distance L between the radially inner edges of the neighboring trap plates 76 is sufficiently smaller than the outer diameter DO and the width B.

Referring back to FIGS. 1(A) and 1(B), the sealing/pump-up device 30 includes a joint hose 160 having a distal end provided with an adapter 162 which can be threadedly connected to a tire valve 92 of a tire 90. As further shown in FIGS. 3(A) and 3(B), the joint hose 160 has a proximal end into which the tip end portion of the connection tube 72 is inserted. Thus, the liquid supply passage 74 extending through the connection tube 72 is in communication with the passage 161 in the joint hose 160 for allowing passage of the sealant 52. Once the adapted 162 is connected to the tire valve 92, the reservoir chamber 68 and the liquid supply passage 74 are communicated with the interior space of the tire 90 through the passage 161 in the joint hose 160.

As further shown in FIGS. 1(A) and 1(B), the container body 43 has a bottom plate 83 that is integrally provided, in its center region, with a lower neck portion 156. The lower neck portion 156 projects downwards, and is threadedly connected to a connector cap 170 that is provided at a distal end of the pressure tube 168. The pressure tube 168, in turn, is connected at its proximal end to the air compressor unit 40. Thus, as soon as the air compressor unit 40 is activated, the compressed air from the air compressor unit 40 is supplied to the air chamber 46 through the pressure tube 168. The air compressor unit 40 is designed to generate a pressure (e.g., 0.2 MPa to 0.3 MPa), which is higher than the prescribed pressure that is designated depending upon the type and specification of tires.

Figure 4:
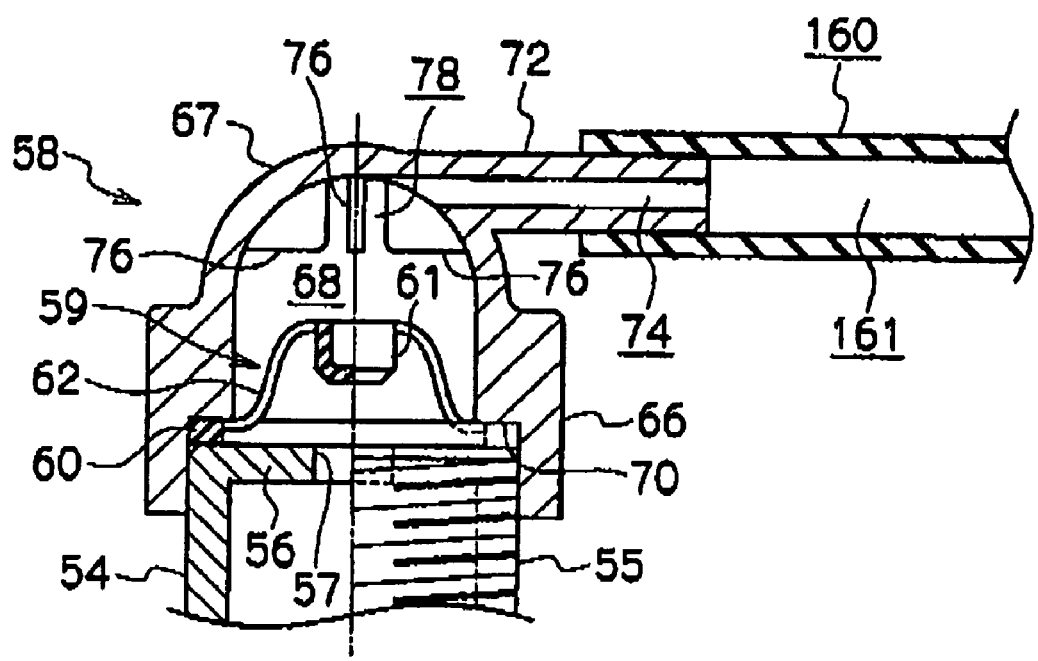
FIG. 4 is a sectional view illustrating the structure of the upper neck portion of the cylindrical container of FIG. 2, as well as the inner lid member and the outer lid cap, and showing a state in which the inner lid member has been forced from the outlet of the container body into a reservoir chamber in the outer lid cap.

When the air chamber 46 is supplied with compressed air from the air compressor unit 40, the air pressure within the air chamber 46 increases and the plunger member 48 acted by the air pressure gradually moves upwards (i.e., toward the injection direction) against the static pressure of the sealant 52 while gradually increasing the inner volume of the air chamber 46. During this inflation of the air chamber 46, the sealant 52 stored in the liquid chamber 44 is gradually pressurized by the plunger member 48 to have a gradually increased pressure. Once the pressure of the sealant 52 reaches a predetermined level, as shown in FIG. 4, the inner lid body 61 is forced by the pressure of the sealant 52 from the closure position within the outlet 57 into the reservoir chamber 68, thereby opening the outlet 57. Thus, the liquid chamber 44 within the container body 43 is brought into communication with the reservoir chamber 68 of the outer lid cap 58, thereby allowing flow of the sealant 52 from the liquid chamber 44 into the reservoir chamber 68.

After the outlet 57 has been opened, as a result of inflation of the air chamber 46, the inner volume of the liquid chamber 44 is decreased by the same amount as the increment in volume of the air chamber 46. Thus, the sealant 52 is discharged from the liquid chamber 44 and flows through the outlet 57 into the reservoir chamber 68 within the outer lid cap 57 so as to fill the reservoir chamber 68. The sealant then flows, through the liquid supply passage 74, the joint hose 160 and the tire valve 90, into the interior of the tire 90.

As shown in FIG. 4, the inner lid body 61 is connected to the seal ring 60 by the pair of connection cords 62, and the seal ring, in turn, is clamped between the top surface of the upper neck portion 54 and the stepped portion 70 of the outer lid cap 58. The inner lid body 61, which has been forced from the closure position into the reservoir chamber 68, is acted by the pressure of the sealant 52 flowing out of the outlet 57, and further by the pressure of compressed air flowing out of the outlet 57 after the discharge of the sealant 52 has been completed, as will be more fully explained hereinafter. Nevertheless, even when the inner lid body 61 is subjected to these pressures, the connection cords 62 limits the movement of the inner lid body toward the downstream side beyond a predetermined distance. In this instance, the connection cords 62 are extended upwards by an amount that corresponds to the magnitude of the pressure acing on the inner lid body 61, so as to maintain the inner lid body 61 at an intermediate position between the outlet 57 and the lower edges of the trap plates 76.

Figure 2:
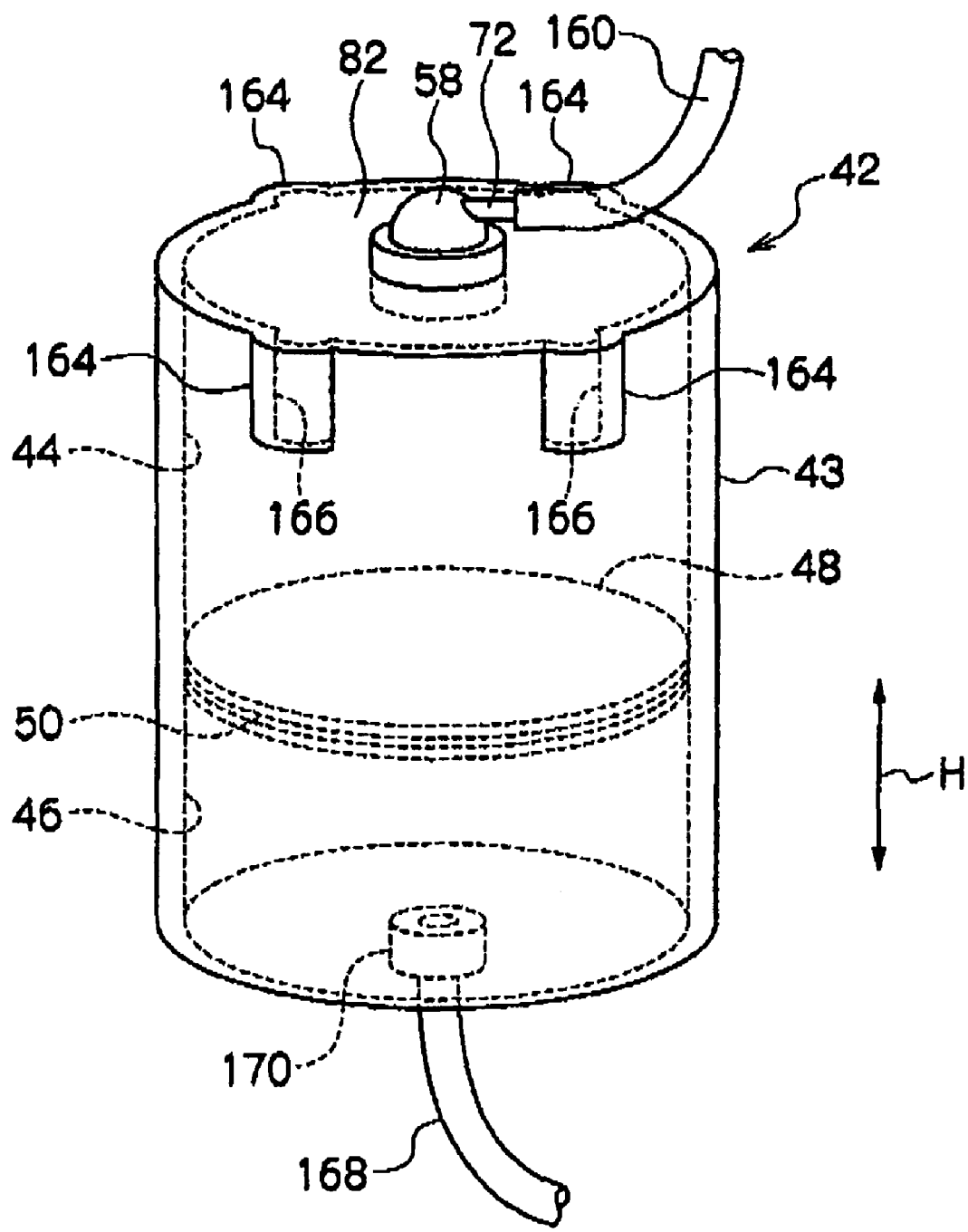
FIG. 2 is perspective view showing the structure of the cylindrical container according to the first embodiment of the present invention.

As shown in FIG. 2, the container body 43 in the upper end side of its peripheral wall portion is integrally provided with a plurality of passage forming portions 164 (four such portions in the illustrated embodiment), which are recessed from the inner wall surface of the container body 43 toward the radially outer side. Each passage forming portion 164 is of semi-cylindrical shape that opens toward the radially inner side, and has lower and upped ends aligned in the height direction, which are closed by a semi-circular bottom plate and a top plate portion 82 of the container body 43, respectively. Each passage forming portion 164 defines therein a bypass passage 166 of semi-circular cross-section, which extends in the height direction of the container body 43, from an intermediate portion of the liquid chamber 44 up to the top plate portion 82 of the cylindrical container 42.

In the sealing/pump-up device, as shown in FIG. 1(B), when the plunger member 48 is moved to its uppermost position under the pressure of the compressed air to minimize the volume of the liquid chamber 44 and maximize the volume of the air chamber 46, the plunger member 48 reaches the bypass passages 166 so that regions of the plunger member on its outer peripheral surface, which are opposite to the bypass passages 166, are spaced from the inner surface of the cylindrical container 42. As a result, the compressed air from the air compressor unit 40 flows from the air chamber 46 into the liquid chamber 44, and then injected into the reservoir chamber 68 in the outer lid cap 58, through the outlet 57. On this occasion, the inner lid body 61 acted by the pressure of the compressed air is maintained by the connection cord 62 at an intermediate position (FIG. 4) in the liquid chamber 68, between the outlet 57 and the lower ends of the trap plates 76. Also, the sealant 52 initially stored in the liquid chamber has already been substantially completely injected into the tire 90 through the joint hose 160.

Therefore, in the sealing/pump-up device 30, once the plunger member 48 has been moved to its uppermost position, the compressed air generated by the air compressor unit 40 is injected into the tire 90 through the pressure tube 168, gas chamber 46, bypass passages 168, liquid chamber 46, reservoir chamber 68, liquid supply path 74 and joint hose 160. Also, when the plunger member 48 is moved to its uppermost position, the remainder of the sealant 52 within the liquid chamber 44, if any, is injected into the tire 90 together with the compressed air.

The manner of repairing a punctured tire 90 with the sealing/pump-up device 30 according to the illustrated embodiment will be explained below.

When a puncture in a tire 90 has been found, first of all, the operator threadedly connects the adapter 162 of the joint hose 160 to the tire valve 92 and actuates the air compressor unit 40, so that compressed air is generated by the air compressor unit 40 and supplied to the gas chamber 46 within the container body 43. As a result, the inner pressure of the gas chamber 46 gradually increases, thereby moving the plunger member from its lowermost position toward the injection direction to increase the inner volume of the gas chamber 46 and compress the sealant 52 in the liquid chamber 44 to have a gradually increased pressure. As soon as the pressure of the sealant 52 reaches a predetermined level, the inner lid body 61 is forced from the closure position in the outlet 57 into the reservoir chamber 68. On this occasion, the movement of the inner lid body 61 toward the downstream side is limited by the connection cords 62, so that the inner lid body 61 is maintained, against the pressure of the sealant 52, at the intermediate position in the reservoir chamber 68, between the outlet 57 and the trap plates 76.

In the sealing/pump-up device 30, after the outlet 57 has been opened and the inner volume of the liquid chamber 44 in the container body 43 is gradually decreased due to the upward movement of the plunger member 48, a volume of the sealant corresponding to the deceased amount of the inner volume of the liquid chamber 44 is injected under pressure into the tire 90 through the reservoir chamber 68, liquid supply path 74, joint hose 160 and tire valve 92.

As shown in FIG. 1(B), when the plunger member 48 has been moved to its uppermost position and the predetermined amount of the sealant 52 has been injected from the container body 43, the gas chamber 46 is brought into communication with the liquid chamber 44 through the bypass passages 166. Thus, the compressed air generated by the air compressor unit 40 is supplied from the gas chamber 46 into the liquid chamber 44, and then injected into the tire 90 through the reservoir chamber 68, liquid supply path 74, joint hose 160 and tire valve 92. Subsequently, once the operator confirms that the inner pressure in the tire 90 has reached a predetermined designated pressure, by using a pressure gauge (not shown) provided in the air compressor unit 40, the air compressor unit 40 is stopped and the adapter 162 is removed from the tire valve 92.

Within a prescribed time after the tire 90 has been inflated, the vehicle equipped with the repaired tire 90 is subjected to a preliminary running over a predetermined distance. During such preliminary running, the sealant in the tire 90 is uniformly distributed along the inner surface of the tire and filled into the puncture hole to close it. After the preliminary running has been completed, the inner pressure of the tire is measured once again and, if necessary, the adapter 162 of the joint tube 160 is threadedly connected to the tire valve 92 and the air compressor unit 40 is actuated to further inflate the tire to its prescribed inner pressure. The repair of the punctured tire is now completed. The repaired tire can be used for a running under a predetermined speed.

In the cylindrical container 42 of the sealing/pump-up device 30 according to the illustrated embodiment, before the occurrence of necessity for repairing a puncture of a tire 90, the inner lid body 61 press-fitted into the outlet is positively maintained in a closure position for hermetically sealing the outlet 57. Furthermore, upon the repair of the punctured tire, once the compressed air is supplied from the air compressor unit 40 into the gas chamber 46 within the container body 43, the pressure of the sealant 52 increased by the plunger member 48 automatically forces the inner lid member 61 from the closure position into the reservoir chamber 68. Thus, the sealant 52 stored in the container body 43 is injected into the tire 90 through the reservoir chamber 68, liquid supply path 74 and the joint hose 160.

In the cylindrical container 42 according to the illustrated embodiment, the connection cords 62 for connecting the inner lid body 61 to the upper neck portion 54 limits the movement, toward the downstream side, of the inner lid body 61 within the reservoir chamber 68, after the inner lid body 61 has been forced from the closure position in the outlet 57 into the reservoir chamber 68. Thus, during the flow of the sealant 52 from the container body 43 into the reservoir chamber 68, it is possible to maintain the inner lid body 61 at the intermediate position within the reservoir chamber 68, between the outlet 57 and the lower edges of the trap plates 76. Since the inner diameter of the reservoir chamber 68 at the intermediate position is sufficiently larger than the outer diameter DO of the inner lid body 61, the sealant 52 can be positively injected out of the container, through the reservoir chamber 68 and the liquid supply path 74. Moreover, the inner lid body 61 is positively prevented from flowing in the downstream side beyond the intermediate position, and causing clogging in the reservoir chamber 68, liquid supply path 74 or joint hose 160, thereby ensuring that the sealant 52 stored in the container body 43 can be positively injected into the punctured tire 90.

In the cylindrical container 42 according to the illustrated embodiment, the seal ring 60 is clamped and held between the top surface of the upper neck portion 54 and the stepped portion 70 of the outer lid cap 58, and formed integrally with the connection cords 62 and the inner lid body 61. It is thus unnecessary to prepare the seal ring 60, the connection cords 62 and the inner lid body 61 as separate elements, thereby making it possible to reduce the number of components for the container body 42 and reduce the production cost. Moreover, the inner lid body 61 can be connected to the upper neck portion 54 and the outer lid cap 58 through the connection cords 62 simply by clamping the seal ring 60 between the top surface of the upper neck portion 54 and the stepped portion 70 of the outer lid cap 58. It is thus unnecessary to connect the ends of the connection cords 62 to the upper neck portion 54 and the outer lid cap 58.

It is of course possible to eliminate the seal ring 60 from the outer lid cap 58. In this instance, the connection cords 62 are connected at their ends to the upper neck portion 54 and/or the outer lid cap 58 so that the inner lid body 61 is connected to the upper neck portion 54 and/or the outer lid cap 58 through the connection cords 62.

In the cylindrical container 42 according to the illustrated embodiment, the connection cords 62 are resiliently extendible/contractible along the low direction of the sealant 52 in the reservoir chamber 68. It is thus possible to effectively reduce the deformation resistance of the connection cords 62 along the flow direction, while preserving a sufficiently high rapture strength of the connection cords 62. As a result, the inner lid body 61 acted by the pressure of the sealant 52 can be readily and smoothly forced from the outlet 57 into the reservoir chamber 68, without difficulty that may otherwise occur due to the deformation resistance. Moreover, after the inner lid body 61 has been moved from the closure position in the outlet 57, even when the supply of the sealant 52 from the cylinder body 42 into the tire 90 is temporarily suspended, the inner lid body 61 is steadily applied with an urging force of the connection cords 62, which prevent movement of the inner lid body 61 into a position in which the outlet 57 is closed.

In the cylindrical container 42 according to the illustrated embodiment, the top portion 67 of the outer lid cap 58 is provided with a plurality of trap plate 76 as a trap means for the inner lid body 61, and the trap plates 76 extends into the reservoir chamber 68 for defining the main passage portion 78 and the auxiliary passage portions 80 on the upper end side or the downstream side of the reservoir chamber 68. Therefore, during the injection of the sealant 52 from the container body 43 into the tire 90, even if the connection cords are ruptured and the inner lid body 61 is allowed to flow toward the downstream side, the inner lid body 61 is trapped by the lower edges of the trap plates 76 and thereby prevented from flowing toward the downstream side beyond the lower edges of the trap plates 76, while the sealant 52 is allowed to flow through the main passage portion 78 and the auxiliary passage portions 80 defined by the trap plates 76. It is thus possible to ensure that the sealant 52 stored in the container body 43 is positively injected into the tire 90, without causing clogging of the inner lid body 61 in the reservoir chamber 68, in the liquid supply path 74, or in the joint hose 160.

Instead of providing the trap plates 76 in the outer lid cap 58, the trap means for the inner lid body 61 can be realized, for example, by arranging a trap member at an intermediate location of the reservoir chamber 68, wherein the trap member has a mesh-like openings each having a dimension smaller than the outer diameter of the inner lid body 61. The trap means may be formed by any other suitable arrangement, provided that the flow of the inner lid body 61 can be prevented and the flow of the sealant 52 toward the downstream side is ensured.

Second Embodiment

Figure 7:
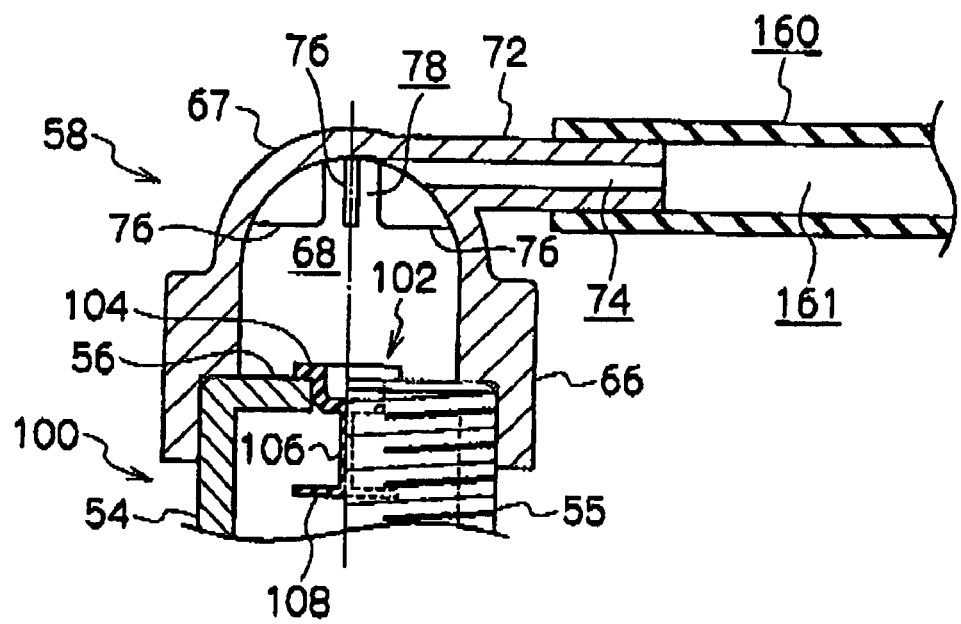
Figure 7:
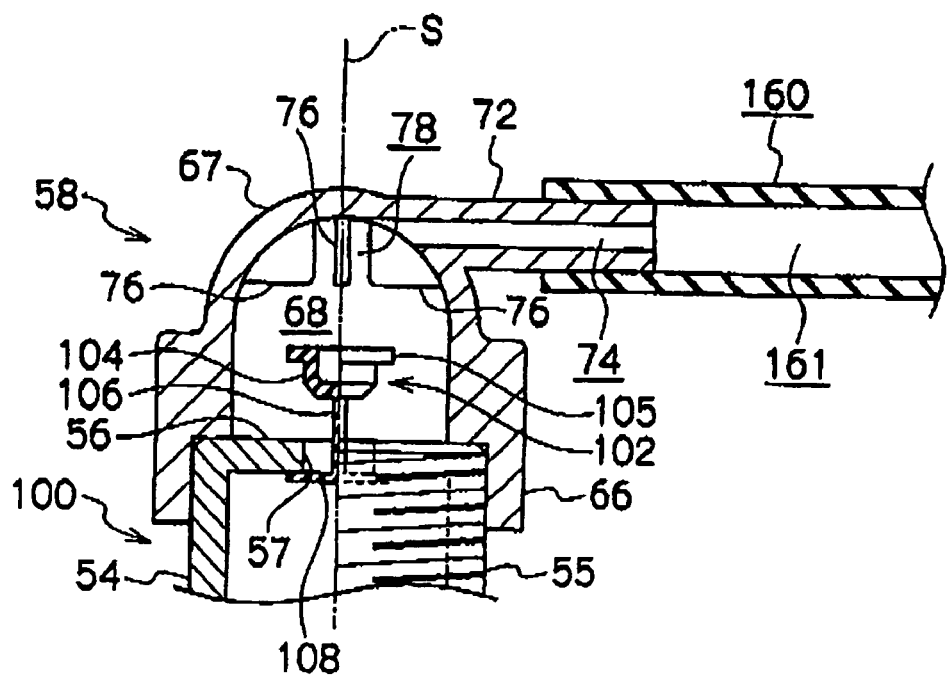

A second embodiment of the cylindrical container according to the present invention is shown in FIGS. 7(A) and 7(B), which is designated by reference numeral 100. The cylindrical container 100 of the second embodiment can be suitably applied to the sealing pump up device 30 as replacement for the cylindrical container 42 of the first embodiment In connection with the cylindrical container 100 of the second embodiment, the elements common to the fist embodiments are denoted by the same reference numerals so as to eliminate superfluous description.

Figure 8:
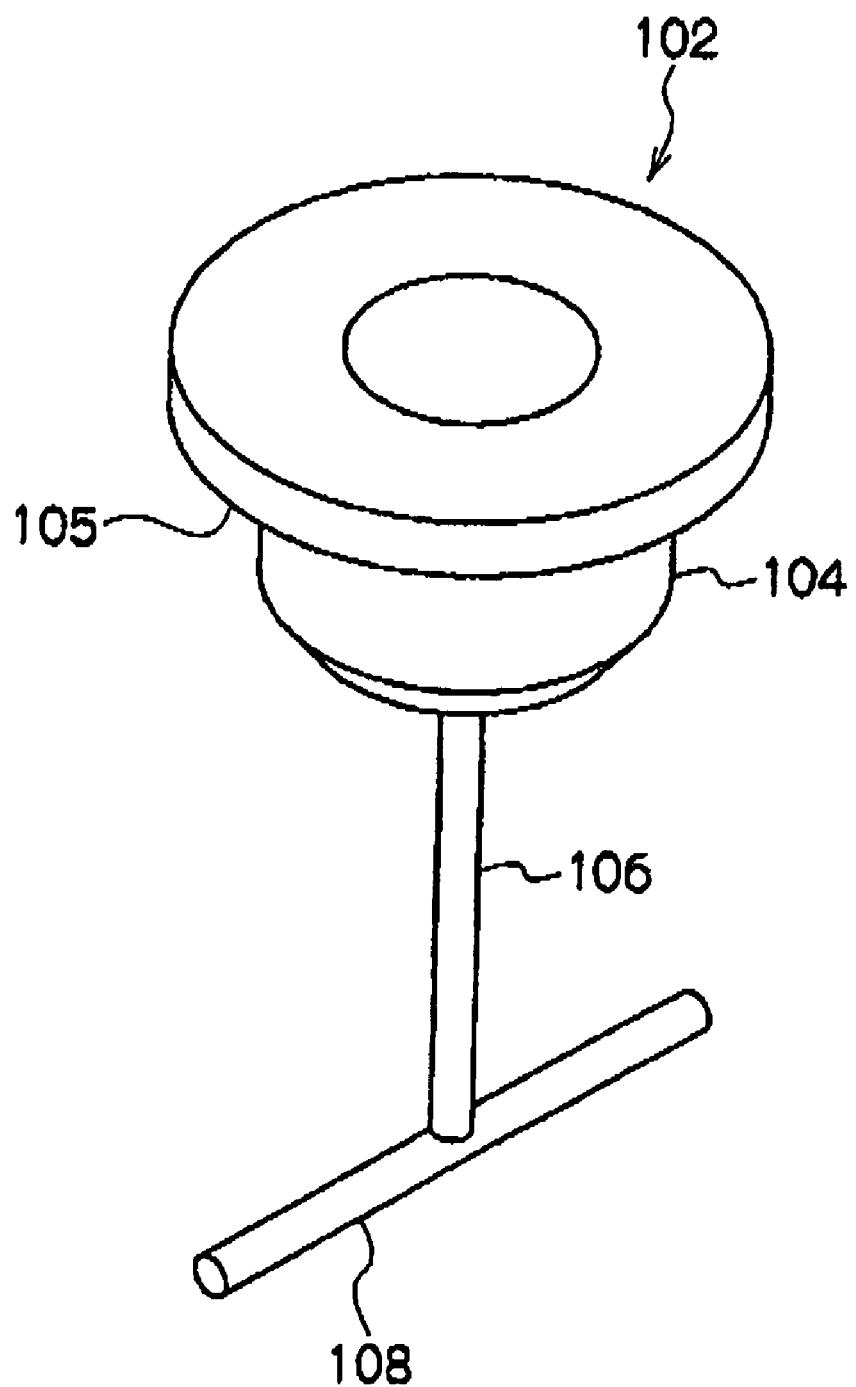
FIG. 8 is a perspective view illustrating the structure of the inner lid member shown in FIGS. 7(A) and 7(B).

The cylindrical container 100 of the second embodiment differs from the cylindrical container 42 of the first embodiment in that the outlet 57 of the container body 43 is closed by an inner lid member 102 as shown in FIG. 8. Other elements of the cylindrical container 100 in the second embodiment are same as those in the cylindrical container 42.

As particularly shown in FIG. 8, the inner lid member 102 includes on its upper end side a substantially cylindrical inner lid body 104 having a closed bottom, and further includes an elongate rod-like connection cord 106 extending downwards from the bottom surface of the inner lid body 104, and a rod-like anchor section 108 extending from the lower end of the connection cord 106 radially outwards. The inner lid body 104, the connection cord 106 and the anchor section 108 of the inner lid member 102 are integrally molded from a suitable elastomer or elastic resin material, such as NBR, silicone rubber, or the like.

The inner lid body 104 has an outer diameter in its lower end portion, which is slightly larger than the inner diameter of the outlet 57, and is integrally formed with a flange-like collar 105 at the upper end portion, which projects radially outwards. The collar 105 has an outer diameter which is larger than the inner diameter of the outlet 57. As shown in FIGS. 7(A) and 7(B), the connection cord 106 has an outer diameter that is sufficiently smaller than the inner diameter of the outlet 57, and a longitudinal dimension that is sufficiently larger than the thickness of the nozzle plate 56. Furthermore, the anchor section 108 has an outer diameter that is sufficiently smaller than the inner diameter of the outlet 57, and a longitudinal dimension or radial dimension that is sufficiently larger than the inner diameter of the outlet 57. The anchor section 108 is connected to the connection cord 106 at its longitudinally intermediate location.

With reference to FIG. 7(A), before the occurrence of necessity for repairing a puncture of a tire 90, the region of the inner lid body 104 on the lower side of the collar 105 is maintained press-fitted in the outlet is positively maintained in a closure position for hermetically sealing the outlet 57. On this occasion, the collar 105 is in abutment with the nozzle plate 56 of the container body 43 so as to prevent downward movement of the inner lid body 104 into inside of the container body 43 through the outlet 57. As shown in FIGS. 7(A) and 7(B), the connection cord 106 of the inner lid member 102 extends through the outlet 57 always, so as to retain the end portion of the connection cord 106 and the anchor section 108 within the container body 43.

In the sealing/pump-up device 30, when the air compressor unit 40 is actuated so that compressed air generated by the air compressor unit 40 is supplied to the gas chamber 46 within the container body 43, the inner pressure of the gas chamber 46 gradually increases, thereby moving the plunger member from its lowermost position toward the injection direction to increase the inner volume of the gas chamber 46 and compress the sealant 52 in the liquid chamber 44 to have a gradually increased pressure. As soon as the pressure of the sealant 52 reaches a predetermined level, as shown in FIG. 7(B), the inner lid body 102 is forced from the closure position in the outlet 57 into the reservoir chamber 68 to open the outlet 57. Thus, the liquid chamber 44 in the container body 43 is brought into communication with the reservoir chamber 68 in the outer lid cap 58 so that sealant 52 stored in the liquid chamber 44 flows into the reservoir chamber 68.

In the sealing/pump-up device 30, after the outlet 57 has been opened and the inner volume of the liquid chamber 44 in the container body 43 is gradually decreased due to the upward movement of the plunger member 48, a volume of the sealant corresponding to the deceased amount of the inner volume of the liquid chamber 44 is injected under pressure into the tire 90 through the reservoir chamber 68, liquid supply path 74, joint hose 160 and tire valve 92.

As shown in FIGS. 7(A) and 7(B), when the inner lid body 104 of the inner lid member 102 has been forced into the reservoir chamber 68 under the pressure of the sealant 52, the anchor section 108 comes into contact with the lower surface side of the nozzle plate 56 and the movement of the inner lid body 104 toward the downstream side is limited by the connection cord 106, so that the inner lid body 104 is maintained, against the pressure of the sealant 52, at the intermediate position in the reservoir chamber 68, between the outlet 57 and the trap plates 76. Furthermore, when the plunger member 48 has been moved to its uppermost position and the bypass passages 166 are opened, the compressed air in the contain body 43 is injected out of the outlet 57 into the reservoir chamber 68. On this occasion also, the inner lid body 104 is maintained, against the pressure of the compressed air, at the intermediate position in the reservoir chamber 68, between the outlet 57 and the trap plates 76.

When the cylindrical container 100 of the second embodiment is applied to the sealing/pump-up device 30 as replacement for the cylindrical container 42 of the fist embodiment, as in the cylindrical container 42, the outlet 57 of the container body 43 is positively maintained by the inner lid body 104 in hermetically sealed state, before repairing the punctured tire 90. Upon repair of the puncture hole in the tire 90, by supplying compressed air from the air compressor unit 40 into the gas chamber 46 of the container body 43, the outlet 57 of the container body 43, which has been closed by the inner lid body 104, is automatically opened so that the sealant in the container body 43 is injected into the tire 90 through the reservoir chamber 68, the liquid supply path 74 and the joint hose 160.

In the cylindrical container 100 of the second embodiment, as in the cylindrical container 42 of the first embodiment, it is possible to positively inject the sealant 52 out of the container, through the reservoir chamber 68 and the liquid supply path 74. It is also possible to ensure that the sealant 52 stored in the container body 43 is positively injected into the tire 90, without causing clogging of the inner lid body 104 in the reservoir chamber 68, in the liquid supply path 74, or in the joint hose 160.

In the cylindrical container 100 of the second embodiment, as compared to the cylindrical container 42 of the first embodiment, the seal ring between the upper neck portion 54 and the outer lid cap 58 is omitted. However, for example, the male-thread 55 of the upper neck portion 54 and the female-thread 69 of the outer lid cap 58 may be formed as tapered threads (pipe threads) so as to ensure the required sealing performance between the upper neck portion 54 and the outer lid cap 58. Alternatively, an independent seal ring may be used separately from the inner lid body 104, and inserted between the upper neck portion 54 and the outer lid cap 58.

In the cylindrical containers 42, 100 according to the first and second embodiments, the sealant 52 in the container body 43 is pressurized by the plunger member 48 arranged in the container body 43. However, substantially the same effects are achieved also in the case of a container body which is subjected to a crushing deformation by an external pressure for pressurizing the sealant in the container body, provided that the outlet of the container body is dosed by the inner lid member 59, 102 according to the first or second embodiment.

Example

Figure 9:
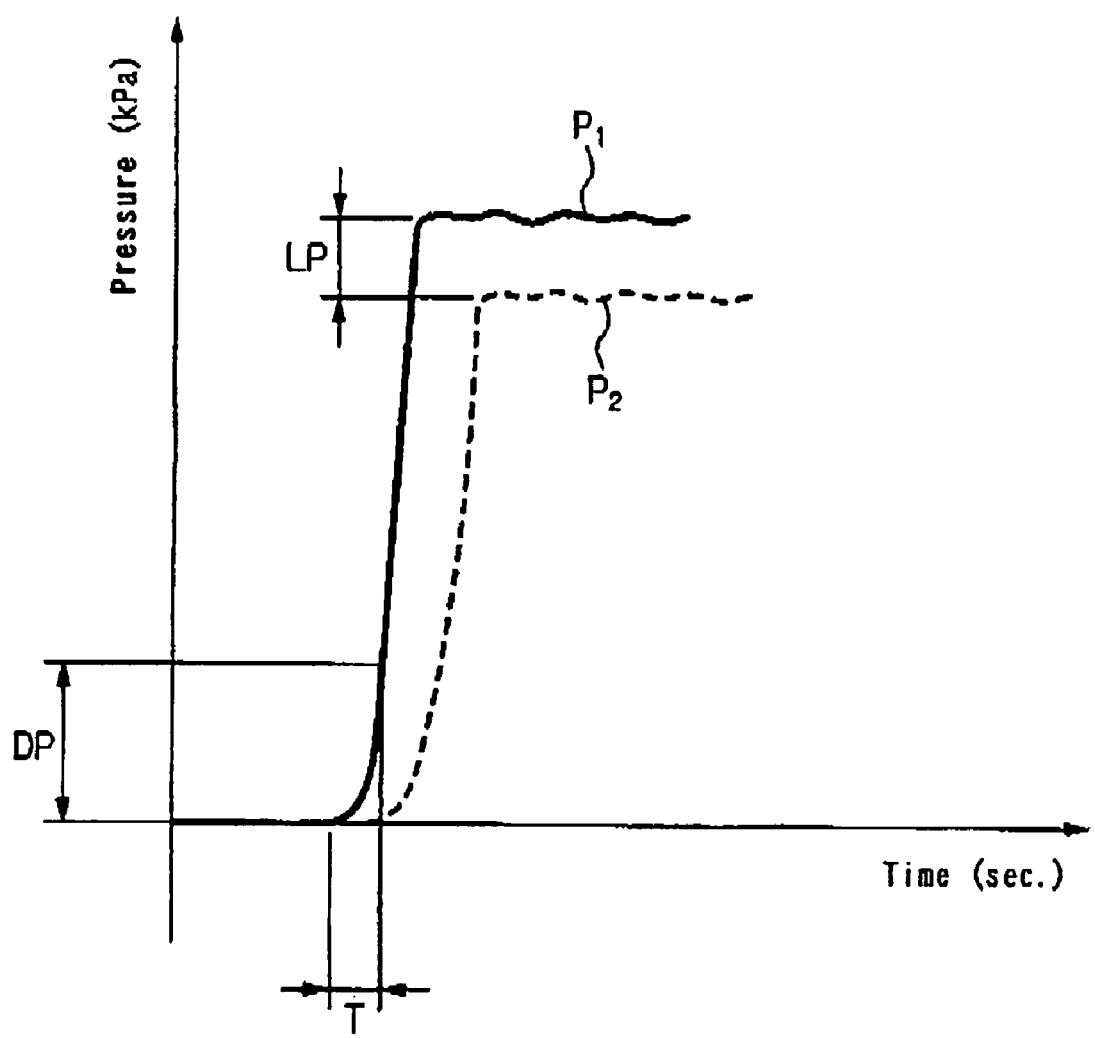
FIG. 9 is a graph showing the relationship between the air pressure in the gas chamber and the liquid pressure in the liquid chamber, with respect to the cylindrical container filled with a predetermined amount of sealant, with the gas chamber supplied with compressed air.

FIG. 9 shows the relationship between the air pressure P1 in the gas chamber 46 of the cylindrical container 42 and the liquid pressure P2 of the sealant 52 in the liquid chamber 44, when the liquid chamber 44 is filled with a predetermined amount of sealant 52 and the gas chamber 46 is supplied with compressed gas from the air compressor unit 40 under a pressure of 0.2 MPa.

As shown in FIG. 9 the symbol DP denotes the difference between the pressures P1 and P2 when the inner lid body 61 has been forced from the closure position into the reservoir chamber 68, and the pressure difference DP was measured as approximately 50 MPa. The symbol T denotes the time between the time point when the supply of the compressed air into the gas chamber 46 is started, and the time point when the inner lid body 61 has been forced into the reservoir chamber 68, and the time T was measured as approximately 0.6 seconds. Furthermore, symbol LP denotes the differential pressure (pressure loss) between the air pressure P1 and the liquid pressure P2, and the differential pressure LP was measured to be approximately 40 MPa.

While the present invention has been described above with reference to preferred embodiments, it is needless to say that the present invention is not limited to these embodiments, and many variations and modifications are possible within the scope of the invention as defined by the appended claims.

The invention claimed is:

1. A container for storing and injecting a liquid sealant for sealing and closing a puncture hole of a pneumatic tire, comprising:
   a container body having an interior space for storing the sealant, and a lid securing portion in which opens an outlet for discharging the sealant to outside;
   an outer lid member having an interior through which extends a sealant path for allowing passage of the sealant therethrough, the outer lid member being connected to the lid securing portion and communicating the sealant path with the interior space of the container body through the outlet;
   an inner lid member press-fitted into the outlet and maintained in a closure position for tightly closing the outlet, the inner lid member being forced from the closure position into inside of the sealant path, by at least one of a pressure of the sealant stored in the container body and a pressure of a gas above the sealant;
   a connector member that connects the inner lid member to one of the lid securing portion and the outer lid member so as to be movable from the closure position to the interior of the sealant path, and limits a movement of the inner lid member toward downstream side, after it has been forced from the closure position into the inside of the sealant path; and a plunger member arranged in the interior space of the container body, for dividing the interior space of the container body into a liquid chamber portion filled with the sealant, and a gas chamber portion to be supplied with compressed gas from outside, the plunger member being movable in an injecting direction thereby increasing a volume of the gas chamber portion while decreasing a volume of the liquid chamber portion, wherein the connector member comprises:

a rod-like cord portion with an outer diameter that is smaller than an inner diameter of the outlet, the cord portion having one end coupled to the inner lid member, and the other end inserted into the interior space of the container body, and a rod-like anchor portion with a total length that is larger than the inner diameter of the outlet, the anchor portion having a longitudinally intermediate region that is fixedly secured to said the other end of the cord portion so as to be retained in the interior space of the container body.

2. A container for storing and injecting a liquid sealant according to claim 1, further comprising a seal member arranged between the lid securing portion and the outer lid member for providing a seal between the lid securing portion and the outer lid member, the seal member being formed integrally with the connector member and the inner lid member.

3. A container for storing and injecting a liquid sealant according to claim 2, wherein the seal member is resiliently extendible/contractible along a flow direction of the sealant in the sealant path.

4. A container for storing and injecting a liquid sealant according to claim 1, wherein:

the sealant path comprises an upstream portion provided with a reservoir section, the reservoir section having an inner diameter that is larger than an outer diameter of the inner lid member, and also with a flow restriction section on the downstream side of the reservoir section, the flow restriction section having an inner diameter that is smaller than the outer diameter of the inner lid member; and the outer lid member comprises an inner lid member trap means for inhibiting a movement of the inner lid member from the reservoir section to the flow restriction section, while allowing flow of the sealant from the reservoir section to the flow restriction section.

5. A container for storing and injecting a liquid sealant according to claim 1, wherein the inner lid member is forced from the closure position to the inside of the sealant path by causing a movement of the plunger member so as to decrease the volume of the liquid chamber portion, thereby increasing at least one of the pressure of the sealant and the pressure of gas above the sealant.

* * * * *